United States Patent [19]

Ishibashi

[11] Patent Number: 5,012,900
[45] Date of Patent: May 7, 1991

[54] BRAKE FOR BICYCLE

[75] Inventor: Hideyuki Ishibashi, Ageo, Japan

[73] Assignee: Bridgestone Cycle Co., Ltd., Tokyo, Japan

[21] Appl. No.: 352,244

[22] Filed: May 16, 1989

[51] Int. Cl.$^5$ .......................... B62L 1/02; B62L 3/00
[52] U.S. Cl. .............................. 188/24.12; 188/24.22
[58] Field of Search ............... 188/24.11, 24.12, 24.14, 188/24.15, 24.22, 2 D, 24.21; 74/489, 50

[56] References Cited

U.S. PATENT DOCUMENTS 4,666,175 5/1987 Mueller ...................... 280/281.1 X

FOREIGN PATENT DOCUMENTS

| 0185642 | 6/1986 | European Pat. Off. |
| 4093 | 5/1905 | France. |
| 0835797 | 12/1938 | France ............................. 188/24.12 |
| 1232285 | 4/1966 | France. |
| 0324912 | 5/1936 | Italy ................................ 188/24.12 |
| 52-3799 | 1/1977 | Japan. |

*Primary Examiner*—Robert J. Oberleitner
*Attorney, Agent, or Firm*—Parkhurst, Wendel & Rossi

[57] ABSTRACT

A caliper brake for a bicycle includes brake members formed as side-pull type caliper arms. The brake members are pivotally supported on a frame of the bicycle and support at ends thereof brake shoes. A pulley is rotatably provided on a free end of one of the brake members. A brake operating wire is connected to brake operating levers at handlebars of the bicycle. The brake operating wire consists of an inner wire and an outer wire. The inner wire extends about the pulley to form a brake operating force acting point of the one brake member by the pulley at which brake operating force acts on the one brake member. One end of the inner wire is connected to the other brake member, and one end of the outer wire is anchored to a free end of the other brake member to form a brake operating force acting point of the other brake member by the anchored point at which brake operating force acts on the other brake member. Operating radii between pivotal points of both the brake members and the brake operating force acting points are made as small as possible.

6 Claims, 7 Drawing Sheets

FIG_2a
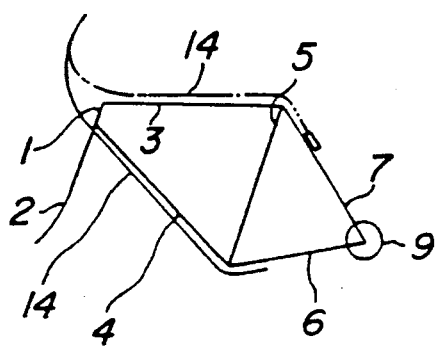
FIG_2b
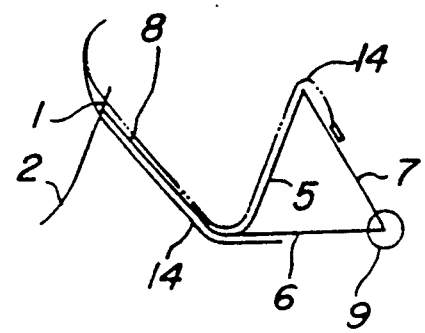
FIG_2c
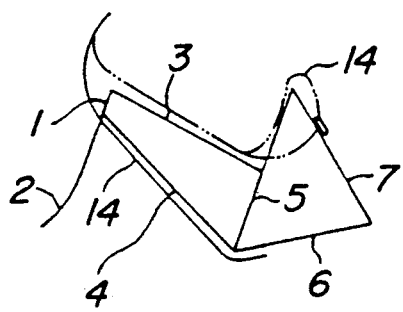
FIG_2d
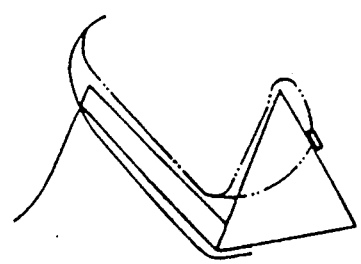
FIG_2e
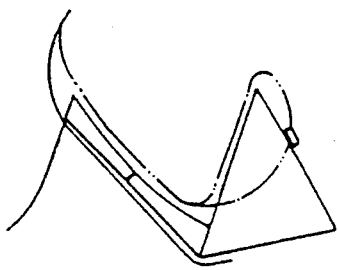
FIG_2f
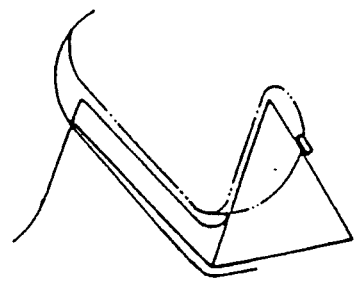

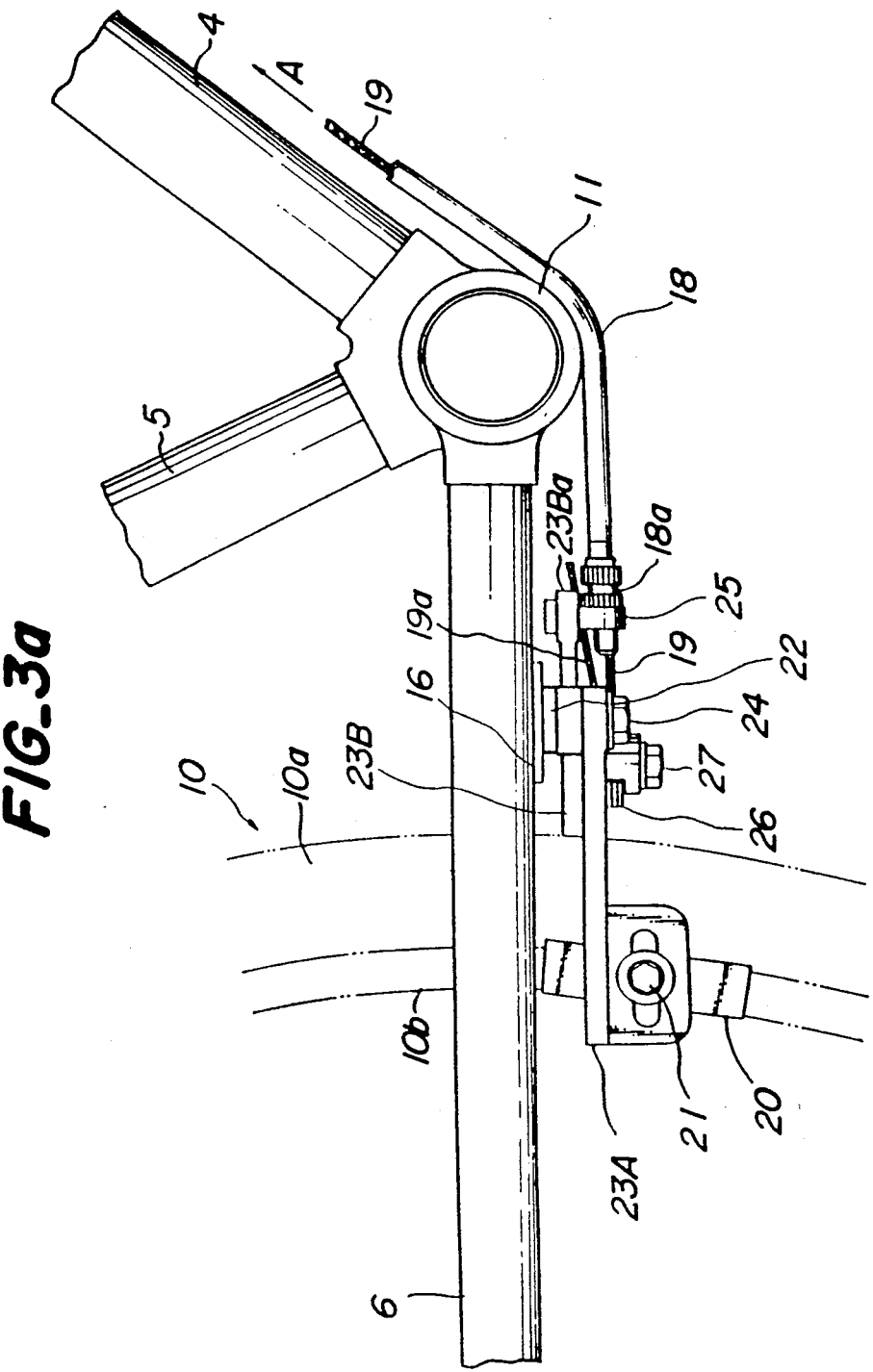

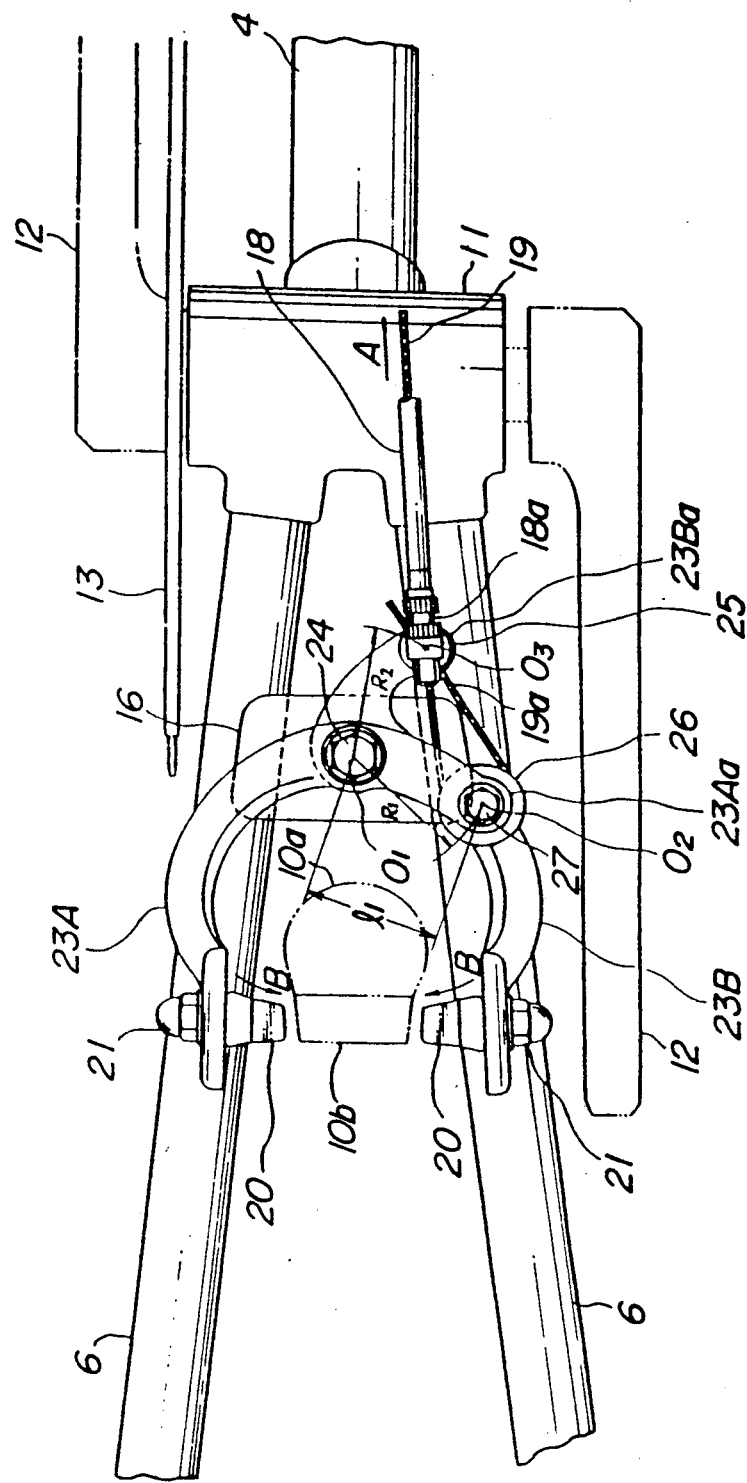
FIG._3b

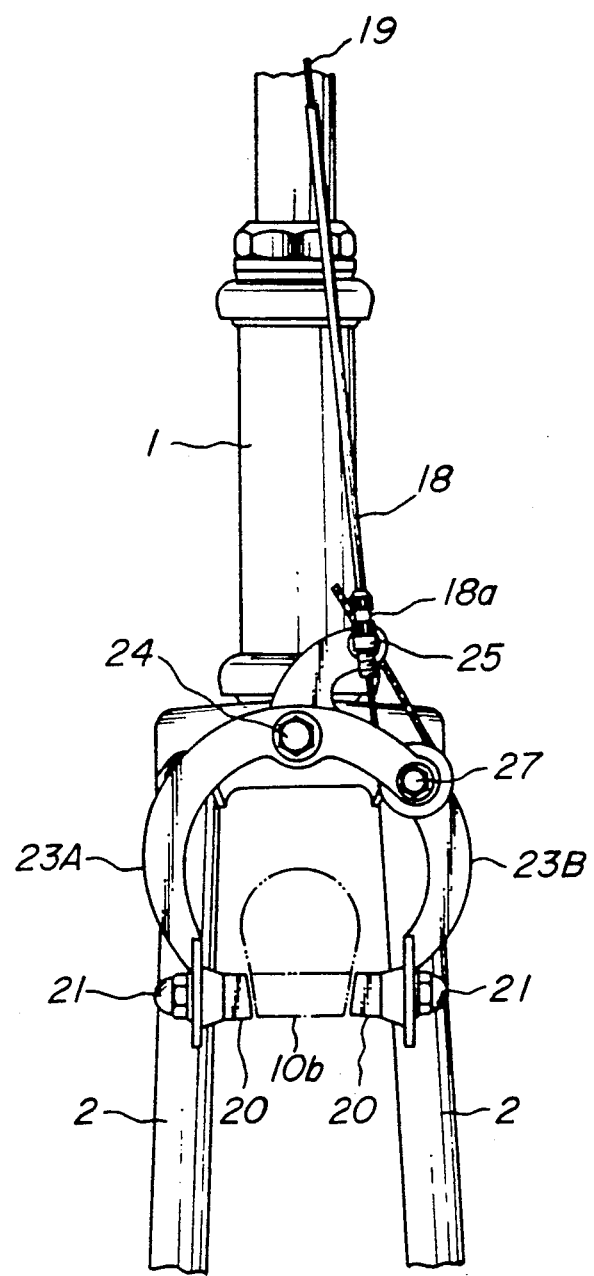
FIG_4a

BRAKE FOR BICYCLE

BACKGROUND OF THE INVENTION

This invention relates to a caliper brake for a bicycle, whose brake shoes are pressed against side faces of a rim of one wheel of the bicycle to brake it.

In general, there are three kinds of caliper brakes, center-pull, side-pull and cantilever types. The brake of the invention belongs to the side-pull type caliper brake.

Before explaining conventional brakes, frame members of a bicycle are explained referring to FIGS. 1–3a and 3b. A bicycle as shown comprises a head tube 1, fork blades 2, a top tube 3, a front or down tube 4, a seat tube 5, chain stays 6 and seat stays 7. Another bicycle shown in FIG. 2b comprises a main frame 5. The bicycle further comprises a band brake 9, a rear wheel 10 having a wheel 10a and a rim 10b, a bottom bracket 11, chain wheel cranks 12 and a chain wheel 13.

FIGS. 2a and 2b illustrate a diamond-shaped frame and a U-shaped frame for bicycles, respectively, and FIGS. 2c and 2d illustrate staggered frames and FIGS. 2e and 2f illustrate roop-shaped frames.

In the case of the diamond-shaped frame of a bicycle shown in FIG. 2a, an operating wire 14 connected to brake levers (not shown) provided at handlebars can be extended easily rearwardly along the front tube 4 as shown in a solid line or along the top tube 3 as shown in two dot-and-dash line without any trouble.

With the bicycles shown in FIGS. 2b–2f other than the diamond-shaped frame bicycle, however, the operating wires 14 must contain many sharply bent portions in order to extend the wire 14 from the handlebars to the seat stays 7. As a result, frictional resistance in the brake wire consisting of an inner and an outer wire disadvantageously increases.

In order to avoid such bent portions of the brake wire in the bicycles shown in FIGS. 2b–2f, the brake may be provided on the chain stays 6 as shown in FIG. 1.

FIG. 1 illustrates a brake including side-pull type caliper arms 15A and 15B of the prior art mounted on chain stays 6. With this arrangement, however, free ends 15Aa and 15Ba of the caliper arms 15A and 15B would interfere with the chain wheel cranks 12, respectively. Therefore, it is impossible to mount the brake on the chain stays 6.

In the drawing, reference numeral 16 denotes a connecting plate spanned or bridged on undersides of the chain stays 6 and fixed thereat. The caliper arms 15A and 15B are pivotally rotatably supported on the connecting plate 16 by means of a bolt 17. A brake wire consists of an outer wire 18 having at its end an adjusting screw 18a fixed to a free end 15Ba of the caliper arm 15B and an inner or operating wire 19 having an end 19a fixed to the free end 15Aa of the caliper arm 15A. Brake shoes 20 are fixed to the other ends of the caliper arms 15A and 15B in opposition to a rim 10b of a wheel.

In the case that the free ends 15Aa and 15Ba of the caliper arm 15A and 15B interfere with other components of the bicycle, such an interference may be eliminated by limiting the outward extensions of the caliper arms. However, since the rotating radii of the caliper arms become smaller, a force acting upon the operating wire 19 must be increased in order to obtain a pressing force of the brake shoes 20 against the rim 10b substantially equal to that of the case having the previous longer rotating radii.

However, operating wires for bicycles are generally used at uppermost limits allowed by their mechanical properties. If the operating wires 19 are subjected to larger forces in use, they would exhibit excessive elongations and the larger forces detrimentally affect their strength and durability.

It has been proposed to use a running pulley block having two pulleys rotatably connected by two side plates for a center-pull type brake of a bicycle as disclosed in Japanese Utility Model Application Publication No. 52-3,799. In more detail, an operating wire having one end fixed to a frame of the bicycle extends about one of the pulleys and the other end is pulled when a brake action is applied to the brake. On the other hand, ends of caliper brake arms are connected by a connecting wire whose center extends about the other pulleys.

With this arrangement, since the running pulley block is moved a distance one half of a moved distance of the operating wire pulled by an operation of brake levers at handlebars, the force caused by the connecting wire connecting the caliper brake arms is advantageously twice the force on the operating wire caused by the brake levers. However, since strokes of brake shoes become one half of original strokes in case directly pulling the connecting wire without using the running pulley block, clearances between the brake shoes and a rim of a wheel of the bicycle must be one half of original clearances. Therefore, the brake shoes are likely to contact the rim of the wheel and require frequent adjustment of clearances particularly in the event that the connecting wire connecting the caliper brake arms has been elongated and movable portions have been worn.

Moreover, outwardly extending portions of the brake interfere with feet and clothes of a cyclist and the brake itself is likely to be damaged when the bicycle falls down.

SUMMARY OF THE INVENTION

It is a primary object of the invention to provide an improved caliper brake for a bicycle which eliminates all the disadvantages of the prior art and which includes brake members actuated by light forces without interfering with the feet and clothes of a cyclist and is compact in construction and durable in use.

In order to achieve this object, the caliper brake for a bicycle according to the invention comprises brake members formed as side-pull type caliper arms, each being pivotally supported on a frame of the bicycle and having one end supporting a brake shoe, a pulley rotatably provided on a free end of one of the brake members, and a brake operating wire including an inner wire and an outer wire. The inner wire extends about the pulley to form an operating force acting point of the one brake member by the pulley at which brake operating force acts on the one brake member. One end of the outer wire is anchored to a free end of the other brake member and one end of the inner wire extends about the pulley being connected to the other brake member to form an operating force acting point of the other brake member by the anchored point at which brake operating force acts on the other brake member; operating radii between pivotal points of the brake members and the operating force acting points are made as small as possible.

With the arrangement according to the invention, since the operating radius between a pivotal point of each of the brake members and the point of the brake member on which a brake operating force acts is made small so as not to interfere with components of the bicycle, it becomes possible to mount the brake on chain stays of the bicycle.

Moreover, according to the invention the operating force of the operating wire connected to brake levers is transmitted through the force multiplying means such as the running pulley block to the brake members, without direct transmission to the brake members so that the force increased by the multiplying means can be transmitted through the connecting rod to the brake members, without increasing the load to be supported by the operating wire.

Therefore, according to the invention, any excessive elongation of the brake operating wire is prevented to ensure the braking action of the brake, while any factors detrimentally affecting the strength and durability of the brake are eliminated in a reliable manner.

According to the invention, although the lever arms of the brake are shortened in order to remove any interference of the brake members with feet and clothes of a cyclist, an increase of the operating force is prevented with the aid of the running block unit and disadvantages of the prior art due to narrow clearance of brake shoes resulting from the use of the running block unit are eliminated by the connecting rod which does not exhibit excessive elongation as in the connecting wire connecting ends of caliper brake arms of the prior art.

In the case of using the running pulley block in order to reduce the brake operating force to be applied to brake levers at handlebars by a cyclist, strokes of the brake shows are unavoidably reduced. To eliminate such a disadvantage, strokes of the brake levers must be twice those in the case without using the running pulley block. However, such long strokes of the brake levers would make difficult the brake operation of the bicycle. According to the invention the operating radii are made small so that even if the strokes of the brake levers remain unaltered, sufficient strokes of the brake shoes and sufficient clearances thereat are obtained.

The invention will be more fully understood by referring to the following detailed specification and claims taken in connection with the appended drawings.

BRIEF DESCRIPTION OF THE DRAWINGS

FIGS. 2a-2f are schematic views illustrating various frame configurations of bicycles;

FIG. 3a is a partial side view of a bicycle illustrating one embodiment of the brake according to the invention;

FIG. 3b is a bottom plan view of the bicycle shown in FIG. 3a;

FIG. 4a is a perspective view illustrating the brake according to the invention mounted on fork blades of a bicycle;

DETAILED EXPLANATION OF THE PREFERRED EMBODIMENTS

Figure 1:
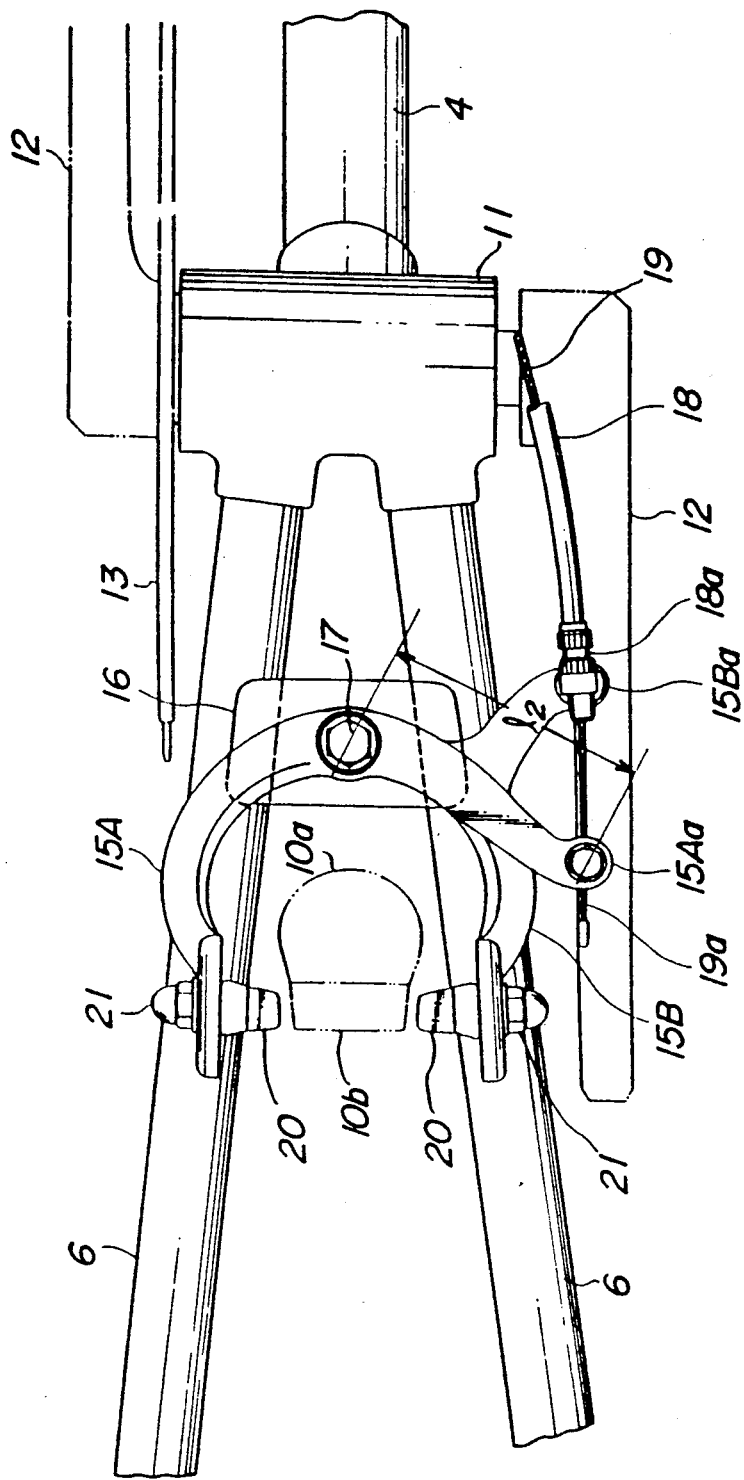
FIG. 1 is a partial bottom plan view of a bicycle illustrating a brake of the prior art mounted on chain stays of a bicycle.

FIGS. 3a and 3b illustrate one embodiment of the invention wherein like components will be designated by the same reference numerals as those used in the explanation of the prior art.

In this embodiment, a connecting plate 16 is formed on its underside with a support base 22 and fixed to undersides of chain stays 6 of a bicycle. Brake members of a caliper brake for supporting brake shoes 20 are formed as side-pull type caliper arms 23A and 23B (23A and 23B representing the main body portions of the caliper arms) which are pivotally rotatably supported on the support base 22 of the connecting plate 16. Operating radii $R_1$ and $R_2$ are distances between the pivotal point $O_1$ of the main body portions of the caliper arms 23A and 23B (FIG. 3b) and center points $O_2$ and $O_3$ of free ends 23Aa and 23Ba of the caliper arms 23a and 23B, respectively. According to the invention, the operating radii $R_1$ and $R_2$ are made as small as possible so as to avoid interference with chain wheel cranks 12.

An operating wire 19 is connected to brake levers (not shown) provided at handlebars of the bicycle. The operating wire 19 has an outer wire 18 provided at its end with an adjusting screw portion 18a which is connected to the free end 23Ba of the caliper arm 23B by means of a fixing metal 25. A pulley 26 is rotatably provided on the other free end 23Aa of the caliper arm 23A by means of a bolt 27. The operating wire 19 extends about the pulley 26 and one end 19a of the operating wire 19 is fixed to the free end 23Ba of the caliper arm 23B. The pulley 26 and the operating wire 19 extending thereabout constitute a running pulley block as force multiplying means.

Figure 4B:
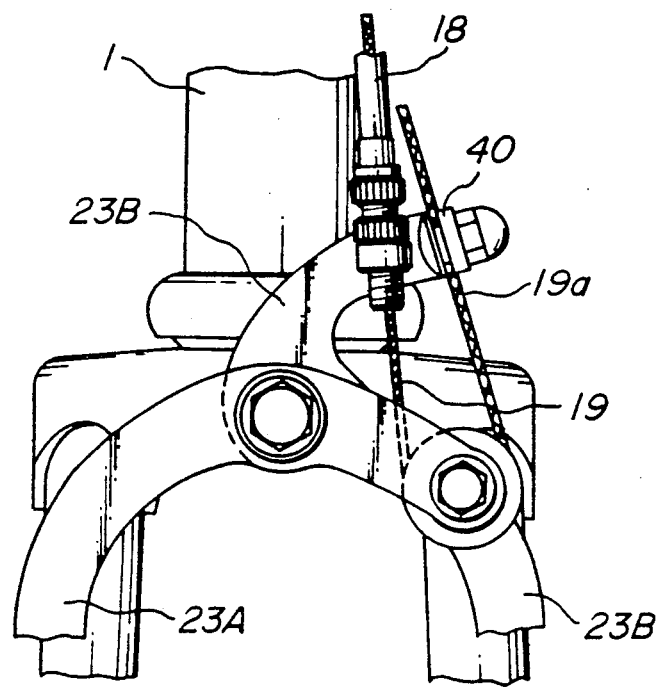
FIGS. 4b and 4c are partial views illustrating the brake shown in FIG. 4 using a bracket for securing the inner wire to the free end of one caliper arm separate from the outer wire of the brake operating wire.
Figure 4C:
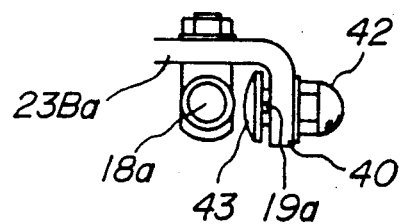
Figure 5:
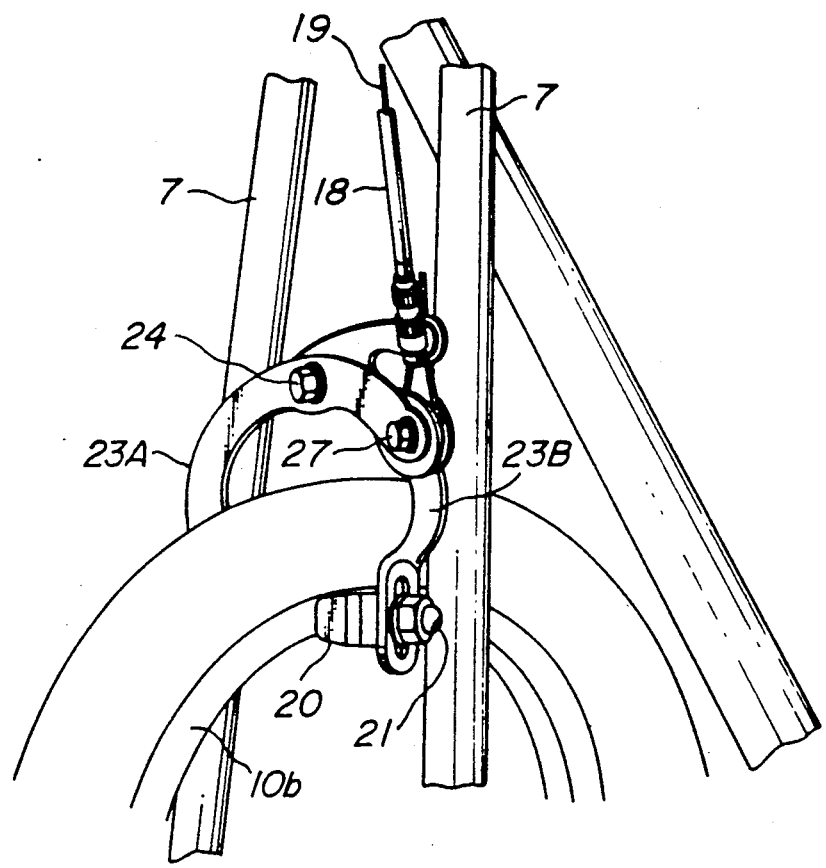
FIG. 5 is a perspective view illustrating the brake according to the invention mounted on seat stays of a bicycle.

In fixing the end 19a of the operating wire 19 to the free end 23Ba of the caliper arm 23B, the end 19a may be secured together with the free end 23Ba of the caliper arm 23B as shown in FIGS. 3a and 3b. However, the end 19a of the operating wire 19 may be secured separate from the outer wire. As shown in FIGS. 4b and 4c, a free end 23Ba of the caliper arm 23B is extended longer and bent as shown at 40, and the end 19a of the wire 19 is fixed to the bent end 40 of the free end 23Ba by means of fastening means 42 and 43.

When the end 19a of the inner wire 19 is secured to the caliper arm 23B together with the outer wire 18, the operating force acting point of the caliper arm 23B is coincident with the fixed points of the inner and outer wires. However, when the end 19a of the inner wire 19 is secured to the caliper arm 23B separate from the outer wire 18, the operating force acting point of the caliper arm 23B is a substantially mid point between the fixed points of the outer and inner wires 18 and 19.

As shown in FIGS. 4a-4c and 5, the brake according to the invention can be mounted on fork blades and seat stays of bicycles, respectively. In these drawings, like components are denoted by the same reference numerals as those used in the preceding drawings. In the prior art, the brakes greatly extend outwardly so that the outwardly extending portions of the brakes interfere with feet and clothes of cyclists and the brakes themselves are likely to be broken or damaged when bicycles fall down. Such a risk is eliminated because the brakes do not have any outwardly extending portions according to the invention.

It is clear in comparison of FIG. 3b with FIG. 1, that the distance $l_1$ between the points $O_1$ and $O_2$ according to the invention is substantially one half of a corresponding distance $l_2$ of the prior art.

The operation of the brake constructed as above described according to the invention will be explained hereinafter. When brake levers (not shown) at handlebars of a bicycle are operated to pull the operating wire 19 forwardly in a direction shown by an arrow A (FIGS. 3a and 3b), the caliper arms 23A and 23B are rotated about the bolt 24 through the pulley 26 in directions shown by arrow B in FIG. 3b so that the brake shoes 20 are pressed against the side faces of the rim 10b of the rear wheel 10 to effect the brake action.

In this case, the forces acting upon the respective free ends 23Aa and 23Ba of the caliper arms 23A and 23B are twice the force acting on the operating wire 19, while the strokes of the free ends 23Aa and 23Ba are one half of the stroke of the operating wire 19 because of the action of force multiplying means or the running pulley block consisting of the pulley 26 and the operating wire 19 extending thereabout.

Therefore, even if the operating radii $R_1$ and $R_2$ between the pivotal point $O_1$ and the operating force acting points $O_2$ and $O_3$ are one half of those of the prior art, the brake shoes 20 effect the braking action not less than that in the prior art.

In other words, according to the invention the interference with the chain wheel cranks and the chain wheel can be prevented by making the outwardly extending distances of the free ends of the caliper arms 23A and 23B as small as possible, even when the brake is mounted on the chain stays 6. The free ends 23Aa and 23Ba of the caliper arms do not extend laterally outwardly beyond the main body portion of each caliper arm.

Moreover, the operation of the operating wire 19 requires only the force of the same order of that in the prior art so that there is no risk of any excessive elongation of the operating wire 19 and no risk of less durability of the brake.

As can be seen from the above explanation, in the caliper brake for a bicycle according to the invention, the operating radius from the pivotal point of the brake members supporting the brake shoes to the operating force acting point is made small so that the brake members do not interfere with components of the bicycle, with the result that the brake can be mounted on chain stays of the bicycle.

In the brake according to the invention, moreover, the operating force of the operating wire connected to brake levers is transmitted to the brake members through force multiplying means such as the running pulley block without direct transmission to the brake members so that the increased force is transmitted to the brake members without increasing forces supported by the operating wire.

According to the invention, therefore, the required braking action is ensured without causing any excessive elongation of the brake operating wire, and any cause detrimentally affecting the strength and durability of the brake is eliminated in a reliable manner.

According to the invention, although the lever arms of the brake are shortened in order to remove any interference of the brake members with feet and clothes of a cyclist, an increase of the operating force is prevented with the aid of the running block unit and disadvantages of the prior art due to narrow clearances of brake shoes resulting from the use of the running block unit are eliminated by the connecting rod which does not exhibit excessive elongation as in the connecting wire connecting ends of caliper brake arms of the prior art.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A caliper brake for a bicycle, comprising:
    support means for mounting said brake on a bicycle frame;
    first and second caliper arms, each being pivotally supported on said frame by said support means, and each having a first end for supporting a brake shoe, a second free end, and a main body portion between said first end and said second, free end;
    a pulley rotatably provided on said second, free end of said first caliper arm; and
    a brake operating wire having an inner wire and an outer wire, said outer wire being anchored at an anchor point to said second, free end of said second caliper arm, said inner wire extending around said pulley to form an operating force acting point of said first caliper arm by the pulley, at which brake operating force acts on said first caliper arm, one end of said inner wire being connected to said second, free end of said second caliper arm to form an operating force acting point of said second caliper arm by the anchoring point, at which brake operating force acts on said second caliper arm;
    wherein said second free ends of said caliper arms do not extend laterally outwardly beyond said main body portion of each caliper arm.

2. The caliper brake of claim 1, wherein said one end of said inner wire and the anchored end of said outer wire are fixed to the operating force acting point on the second, free end of said second caliper arm.

3. The caliper brake of claim 1, wherein said one end of said inner wire is fixed to the second, free end of said second caliper arm at a point separate from the anchor point of said outer wire.

4. The caliper brake of claim 1, wherein said brake is supported on chain stays of the bicycle frame.

5. The caliper brake of claim 1, wherein said brake is supported on fork blades of the bicycle frame.

6. The caliper brake of claim 1, wherein said brake is supported on seat stays of the bicycle frame.

* * * * *